May 14, 1968 N. M. GARRAHAN 3,383,524

SOLID STATE PULSE GENERATOR WITH CONSTANT
OUTPUT WIDTH, FOR VARIABLE INPUT
WIDTH, IN NANOSECOND RANGE

Filed Oct. 21, 1965 2 Sheets-Sheet 1

INVENTOR

Norman M. Garrahan

BY [signature]

ATTORNEY

May 14, 1968 N. M. GARRAHAN 3,383,524

SOLID STATE PULSE GENERATOR WITH CONSTANT OUTPUT WIDTH, FOR VARIABLE INPUT WIDTH, IN NANOSECOND RANGE

Filed Oct. 21, 1965 2 Sheets-Sheet 2

INVENTOR

Norman M. Garrahan

BY

ATTORNEY

United States Patent Office 3,383,524
Patented May 14, 1968

3,383,524

SOLID STATE PULSE GENERATOR WITH CONSTANT OUTPUT WIDTH, FOR VARIABLE INPUT WIDTH, IN NANOSECOND RANGE

Norman M. Garrahan, Silver Spring, Md., assignor to the United States of America as represented by the Administrator of the National Aeronautics and Space Administration Filed Oct. 21, 1965, Ser. No. 500,446
5 Claims. (Cl. 307—265)

ABSTRACT OF THE DISCLOSURE

Apparatus for the generation of fixed duration output pulses from variable length input pulses, in which a constant current generator is employed in conjunction with a pulse control circuit. The control circuit utilizes a tunnel diode connected in parallel with an inductor.

The invention described herein may be manufactured and used by or for the Government of the United States of America for governmental purposes without the payment of any royalties thereon or therefor.

The present invention relates to a single or double pulse generator capable of generating pulses of constant width in the nanosecond range.

Presently, when generating pulses of short period and constant width, a mono-stable or blocking oscillator is normally used which requires differentiating the input pulse to obtain a trigger pulse of negligible time duration when compared to the output pulse. These known circuits cannot produce output pulses the widths of which are independent of the trigger pulse unless complex circuitry is used and a relatively large amount of power is supplied thereto. Also, these prior circuits cannot have repetition rates in the megacycle range without experiencing excess signal loss or other undesirable results.

Therefore, the trend of circuit design for generators of the type described has been toward using tunnel diodes due to their rapid response and low power requirement. For example, see United States Patents 3,142,765, 3,142,766, 3,153,748 and Lile Nanosecond High Current Pulse Circuit, RCA Technical Note No. 524, March 1962.

The present invention provides a significant improvement over the circuits of the above patents and publication by providing in one embodiment a constant current source which supplies a constant current pulse to a tunnel diode in parallel with an inductance. With this arrangement, input pulses of variable widths in the nanosecond range yield output pulses of predetermined and fixed widths regardless of the frequency of the input pulses.

In another embodiment of the present invention, two back-to-back tunnel diodes in parallel with an inductance are driven by a constant-current generator. In this embodiment, input pulses of variable widths in the nanosecond range yield output pulses of fixed widths, and one of two additional outputs, a coincident and a time delay output are available depending upon the polarity of the connection of the tunnel diodes.

Therefore, it is an object of the present invention to provide a tunnel diode and parallel inductance driven by a constant current source to generate output pulses of fixed width regardless of the pulse width supplied by said constant current source.

Another object of the present invention is to provide two tunnel diodes in back-to-back configuration in parallel with an inductance, and a constant current generator feeling pulses of various widths to said parallel configuration whereby outputs of constant widths in the nanosecond range are produced. In addition, two outputs of this configuration are available for pulses of predetermined polarities.

Further objects of the present invention will become apparent with the following detailed description and taken in view of the appended drawings in which.

Figures 1, 2:
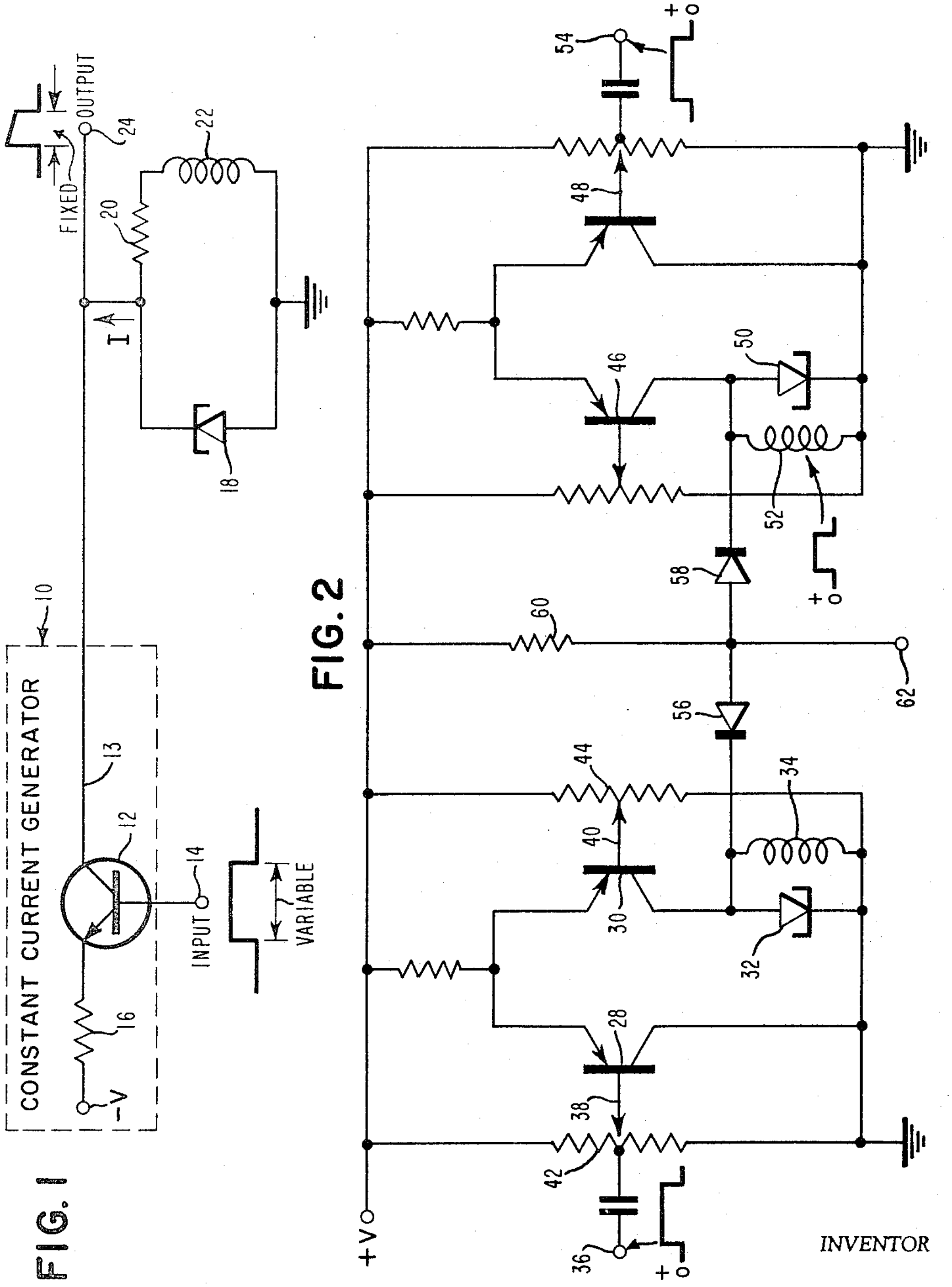
FIGURE 1 is a schematic illustration of a first embodiment of the present invention.
FIGURE 2 is a schematic illustration of a threshold detector and logic circuit incorporating the first embodiment.

Referring to the drawings in detail, there is shown in FIGURE 1 a constant current generator generally indicated as 10, comprising a transistor 12 having a base input terminal 14 and a voltage source —V connected to the emitter through resistor 16.

Connected between ground and the collector electrode 13 is a tunnel diode 18 which is in parallel with an inductor 22. Series resistor 20 may be the inherent resistance for inductor 22. Output terminal 24 is connected across this tunnel diode-inductor combination.

Figures 3, 4, 5:
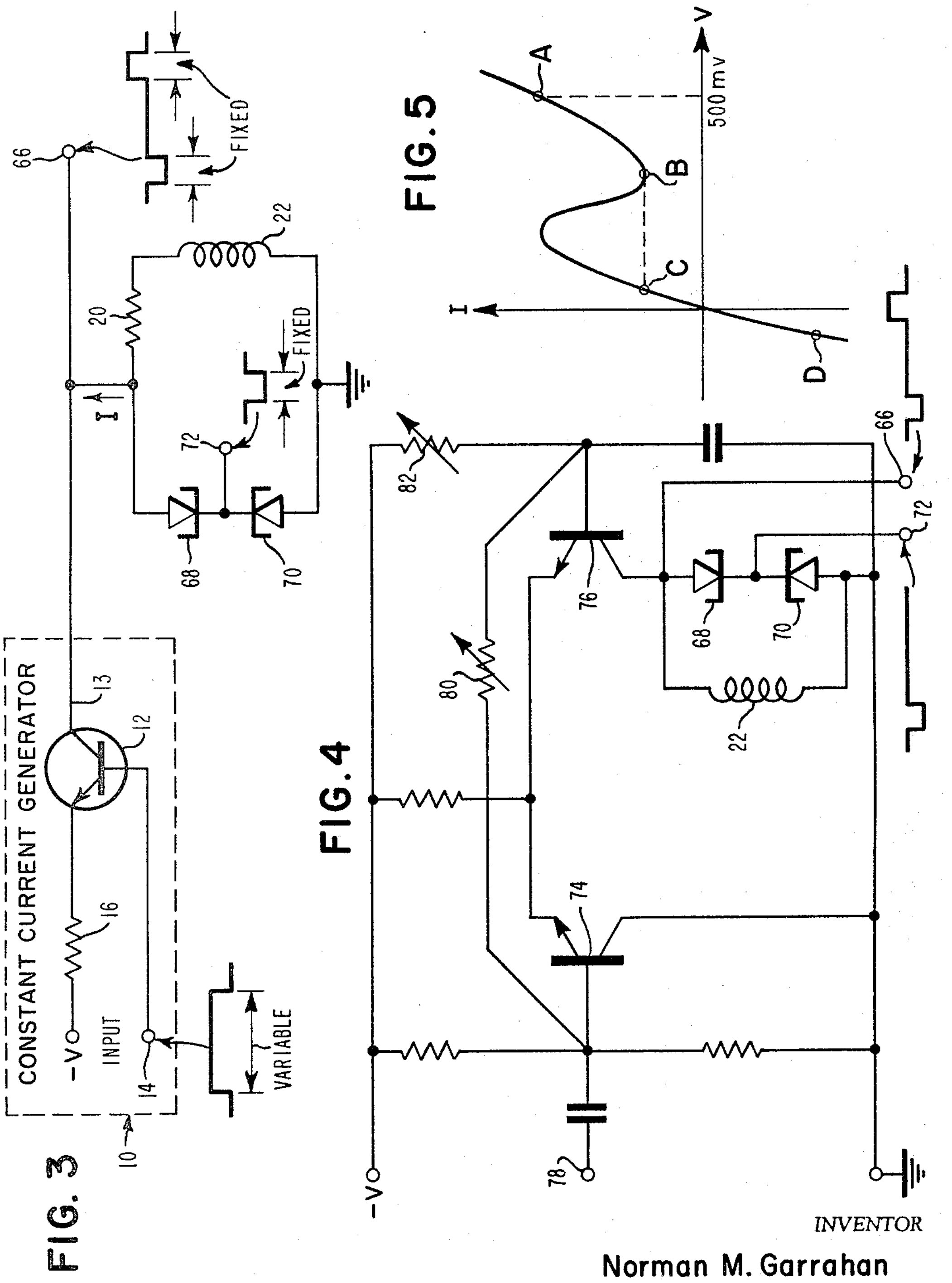
FIGURE 3 is a schematic illustration of a second embodiment of the present invention.
FIGURE 4 is a schematic illustration of a threshold detector incorporating said second embodiment.
FIGURE 5 illustrates the characteristic curve of a tunnel diode.

In operation, an input pulse of varying or uncontrolled width is supplied to the input terminal 14 of constant current generator 10. Transistor 12 responds by driving a current which has an amplitude greater than the peak current of tunnel diode 18 into the parallel combination of the tunnel diode and inductance leg. Initially, inductance 22 represents a very high impedance and prevents a rapid current change therein so that at about time zero all the current I goes through the tunnel diode yielding a voltage across the tunnel diode which appears at output terminal 24. This output voltage is represented by point A on FIGURE 5 and it can be seen that it is maximum output voltage for the circuit. The current through inductor 22 is initially zero but will increase with time and therefore the current through tunnel diode is decreasing with time. Thus, the current in tunnel diode 18 decreases from point A to point B as seen in FIGURE 5 and the voltage will also decrease accordingly. When the voltage reaches point B in FIGURE 5, it immediately drops near zero to point C and at this time most of the current is flowing through inductor 22 which now presents a very low impedance such that the output voltage will now be approximately zero for the remainder of the input pulse. Therefore, in this way, the width of the output pulse is controlled and fixed by tunnel diode 18 and inductor 22 regardless of the time duration of the input pulse.

Referring now to FIGURE 2, there is illustrated a schematic diagram of a threshold detector and logic circuit embodying the fixed-duration generator of FIGURE 1. Transistors 28 and 30 together with tunnel diode 32 and inductor 34 form a threshold detector circuit such that the voltage across tunnel diode 32 switches to its high voltage state whenever the input to terminal 36 exceeds the threshold level. The threshold is set by adjusting the wiper arms 38 and 40 which contact resistors 42 and 44 respectively, and transistor 28 is biased so that it is normally conducting and transistor 30 is biased so that it is normally cut off. Thus, the addition of inductance 34 across tunnel diode 32 forms the constant-width generator with transistor 30 acting as the constant current source, and a constant pulse width of a predetermined period in the nanosecond range, for example, 50 nanoseconds, is generated across tunnel diode 32 whenever the input to terminal 36 exceeds the threshold level.

Transistors 46 and 48, tunnel diode 50, and inductor 52 comprise a similar circuit which generates, in the manner described above, a constant pulse width across tunnel diode 50 whenever the voltage at terminal 54 exceeds the threshold level.

Two back-to-back silicon diodes 56 and 58 are each connected with each respective cathode to the output of the constant width pulse generator. A bias resistor 60 is connected between the junction of diodes 56 and 58 and the reference voltage so that the output developed on terminal 62 is such that only a simultaneous output across tunnel diodes 32 and 52 produce an output at terminal 62. Thus, the circuit of FIGURE 2 presents a coincidence network and an output is produced only when tunnel diodes 32 and 50 are in their high voltage states. The output at 62 is obtained when the *leading edges* of the input pulses at terminals 36 and 54 are in coincidence within a predetermined range, for example, 50 nanoseconds.

It is apparent that the polarities of transistors 28, 30, 46 and 48 as well as the polarities of diodes 56 and 58 can be reversed so that the network responds to negative going input pulses.

Another embodiment of the invention is illustrated in FIGURE 3 wherein like reference characters refer to like structure of the embodiment of FIGURE 1. A first output terminal 66 is connected to the collector electrode 13 of transistor 12. In parallel therewith is a grounded pair of tunnel diodes 68 and 70 connected back-to-back with a second output terminal 72 connected between the junction thereof. Inductor 22 is connected in parallel with said diodes 68 and 70, and resistance 20 could be the inherent resistance of inductor 22. If it is desired to reverse the polarity of the output pulses of terminal 66, it is only necessary to reverse the polarity of tunnel diodes 68 and 70.

In operation, an input signal is supplied to input terminal 14 and the signal can have an uncontrolled or variable width. At the leading edge of the input pulse, current generator drives current I into the parallel combination of the tunnel diodes 68 and 70 and inductance. Since the current I is greater than the peak current of the tunnel diode 70, the tunnel diode 70 switches to its high voltage state, point A of FIGURE 5. Tunnel diode 68 remains in its low voltage state and presents a very low impedance as shown in point D of FIGURE 5.

Initially, inductance 22 represents a very high impedance and all current I goes through the tunnel diodes yielding an output voltage at terminal 66 which is approximately the voltage across the diode 70 the value of which is shown at point A of FIGURE 5. With the passing of time, the current through inductance L increases thereby decreasing the current through the tunnel diodes. The voltage across tunnel diode 70 decreases from point A to point B and then quickly to point C. At this time, the current is also flowing through the inductor 22 which now presents a very low impedance to the passing of current since the output voltage will be approximately zero for the remainder of the input pulse.

When the input pulse falls to zero, the current through the inductance 22 now flows through tunnel diodes 68 and 70 in the opposite direction causing diode 68 to switch to its high voltage state giving a second output pulse of opposite polarity from the first output pulse. When tunnel diode 68 is in its high state, tunnel diode 70 is in its low voltage state.

With the polarity shown in FIGURE 3, the output at terminal 72 is a single pulse having the same polarity as the first pulse of output terminal 66 because when tunnel diode 70 is in its low voltage state, output terminal 72 is substantially grounded. Inductor 22 and diodes 68 and 70, therefore, control and fix the width of the output pulse on terminal 72.

FIGURE 4 shows the schematic diagram of a threshold detector comprising the constant pulse width generator of FIGURE 3. Transistor 74 is normally biased on and 76 normally biased off. Transistor stages 74 and 76, together with the tunnel diodes in the collector circuit of transistor 76 comprise a threshold detector circuit such that the voltage across diode 70 switches to its high voltage state whenever the input to terminal 78 exceeds the threshold level. Diode 68 is in its low level state. The threshold level is set by adjusting the values of resistors 80 and 82. The addition of inductance 22 across diodes 68 and 70 forms the constant width pulse generator with transistor 76 acting as a constant current source. Therefore, a pulse of constant width is generated across diode 70 in the manner described above whenever the input pulse exceeds the threshold level. When the input signal is removed, diode 68 switches to its high voltage state and a second pulse is generated of opposite polarity and identical width as the first pulse. The value of the parallel inductance 22 determines the output pulse width and in the present example an inductance of 56 microhenries produces a pulse width of 50 nanoseconds.

It is apparent that the circuit of FIGURE 4 has great flexibility and an additional coincident or delayed pulse is produced at output terminal 66 depending upon polarity arrangement of tunnel diodes 68 and 70. Moreover, the network can be designed to respond to a positive input pulse by replacing the NPN transistors with PNP transistors and reversing the polarity of the voltage supply. In this case, there is again the choice of output pulses at terminal 66 depending upon the polarity of tunnel diodes 68 and 70.

Further flexibility can be achieved by moving the tunnel diode and parallel inductance over to the collector of transistor 74 and biasing 74 off and transistor 76 on.

The herein described invention provides a circuit for producing short pulse widths with fast-rise times in the nanosecond range which circuit is simple in construction and uses conventional components with lower power drain and being compatible with other low power and fast response tunnel diode circuitry. Pulse widths are conveniently controlled by varying the parallel inductance. In addition, the back-to-back tunnel diode arrangement of the present invention provides for all possible combinations of pulse output polarity relative to input pulse polarity. The output pulses are obtained at the rise and/or fall time of the input pulses, which permits its use as a zero crossing detector. There are normally two outputs available, double or single pulses, but the threshold level is by simple resistor adjustments. Moreover, the biasing of both transistors of the threshold detector is derived from the same voltage divider thereby achieving a stable threshold level and facilitating a simple threshold adjustment.

Other and further modifications can be made to the presently disclosed examples of the present invention without departing from the spirit and scope thereof.

What is claimed is:

1. A pulse generator for generating pulses of constant width comprising a constant current generator having an input terminal for receiving input pulses and an output lead, an output terminal connected to said output lead, and output pulse control means connected between said lead and ground for producing an output pulse at said output terminal which has a leading edge coincident with the leading edge of the input pulse and for terminating the output pulse after a predetermined period regardless of the width of the input pulse, said pulse control means comprising a pair of tunnel diodes connected back-to-back and connected in parallel with inductor means.

2. A threshold detector circuit, logic circuit or the like comprising an input terminal for receiving input pulses, an output terminal for feeding output pulses of fixed widths, a first normally conducting transistor stage coupled to said input terminal and cutting off when the input pulse exceeds a predetermined level, a second normally non-conducting transistor stage coupled to said first stage and conducting when said first stage becomes non-conducting, said second stage having an output lead coupled to said output terminal, and a parallel combination connected between said lead and ground, said combination comprising tunnel diode means connected in parallel with an inductor.

3. A circuit as set forth in claim 2 wherein said tunnel diode means comprises a single tunnel diode.

4. A threshold detector circuit as set forth in claim 2 wherein said tunnel diode means comprises a pair of tunnel diodes connected back-to-back, and an additional output terminal connected to the junction of said pair of tunnel diodes.

5. A circuit as set forth in claim 3 further comprising another input terminal, another first transistor stage coupled to said another input, another second transistor stage coupled to said another first transistor stage and having an another output lead coupled to said output terminal, an another parallel combination connected between said another lead and ground and comprising a tunnel diode connected in parallel with an inductor, a first diode having one electrode connected in series with said output lead, a second diode having one electrode connected in series with said another output lead, the other electrodes of said first and second diodes being connected together and to said output terminal, said first and second diodes being poled so that a pulse is presented at said output terminal only when the pulses controlled by said parallel combination and said another parallel combination are coincident.

References Cited

UNITED STATES PATENTS 3,215,948 11/1965 Dalton ---------- 307—88.5 XR

ARTHUR GAUSS, *Primary Examiner.*

J. ZAZWORSKY, *Assistant Examiner.*